US011692640B2

United States Patent
Yuan et al.

(10) Patent No.: US 11,692,640 B2
(45) Date of Patent: *Jul. 4, 2023

(54) ACTUATOR ASSEMBLY FOR A FLUID CONTROL DEVICE

(71) Applicant: FISHER JEON GAS EQUIPMENT (CHENGDU) CO., LTD., Chengdu (CN)

(72) Inventors: Jie Yuan, Chengdu (CN); Min Qiu, Chengdu (CN); Yanbo Shi, Chengdu (CN); Xiaojuan Qin, Chengdu (CN)

(73) Assignee: FISHER JEON GAS EQUIPMENT (CHENGDU) CO., LTD., Chengdu (CN)

( * ) Notice: Subject to any disclaimer, the term of this patent is extended or adjusted under 35 U.S.C. 154(b) by 6 days.

This patent is subject to a terminal disclaimer.

(21) Appl. No.: 16/968,864

(22) PCT Filed: Feb. 10, 2019

(86) PCT No.: PCT/CN2019/074750
§ 371 (c)(1),
(2) Date: Aug. 10, 2020

(87) PCT Pub. No.: WO2019/154404
PCT Pub. Date: Aug. 15, 2019

(65) Prior Publication Data
US 2021/0048119 A1    Feb. 18, 2021

(30) Foreign Application Priority Data

Feb. 10, 2018   (CN) .......................... 201820263324.8

(51) Int. Cl.
*F16K 31/53* (2006.01)
*F16K 17/168* (2006.01)
*F16K 31/60* (2006.01)

(52) U.S. Cl.
CPC ............ *F16K 31/53* (2013.01); *F16K 17/168* (2013.01); *F16K 31/60* (2013.01)

(58) Field of Classification Search
CPC ........ F16K 31/53; F16K 17/168; F16K 31/60; F16K 31/56
See application file for complete search history.

(56) References Cited

U.S. PATENT DOCUMENTS 4,457,334 A    7/1984   Becker et al.
4,580,596 A *  4/1986   Stehling .................. F16K 15/18
                                                 137/523

(Continued)

FOREIGN PATENT DOCUMENTS

CN    101205978 A    6/2008
CN    101696667 A    4/2010

(Continued)

OTHER PUBLICATIONS

International Search Report and Written Opinion for Application No. PCT/CN2019/074750, dated May 9, 2019.

(Continued)

*Primary Examiner* — Michael R Reid
(74) *Attorney, Agent, or Firm* — Marshall, Gerstein & Borun LLP

(57) ABSTRACT

A fluid control device includes a body having an inlet, an outlet, and a fluid flow path between the inlet and the outlet, a seat, and a control element that is coupled to a stem. The control element and the stem are movable along a first axis and biased toward a closed position in which the control element engages the seat. The fluid control device includes an actuator assembly including a shaft that is operatively coupled to the stem via a Scotch yoke mechanism such that rotation of the shaft in a first rotational direction causes movement of the stem and control element along the first axis in a first translational direction. The actuator assembly (Continued)

includes a trigger mechanism that is responsive to fluid pressure and prevents rotation of the shaft in a first mode of operation and releases the shaft to allow rotation in a second mode of operation.

19 Claims, 5 Drawing Sheets

(56) References Cited

U.S. PATENT DOCUMENTS

| | | | | |
|---|---|---|---|---|
| 5,178,185 | A * | 1/1993 | Stehling | F16K 15/18 137/385 |
| 5,622,201 | A * | 4/1997 | Chang | F16K 1/12 251/291 |
| 7,040,339 | B2 * | 5/2006 | Istre, Jr. | F16K 1/12 137/220 |
| 10,473,232 | B2 * | 11/2019 | Telep | F02M 26/52 |
| 10,557,562 | B2 * | 2/2020 | Sattelberg | F16K 31/54 |
| 11,125,348 | B2 | 9/2021 | Groza et al. | |
| 11,326,713 | B2 * | 5/2022 | Yan | F16K 1/12 |
| 2012/0138029 | A1 | 6/2012 | Albert et al. | |

FOREIGN PATENT DOCUMENTS

| | | |
|---|---|---|
| CN | 102482998 A | 5/2012 |
| JP | 2012-219903 A | 11/2012 |
| JP | 2017-057814 A | 3/2017 |
| JP | 2017-155846 A | 9/2017 |

OTHER PUBLICATIONS

"Slam-Shut Valves," Emerson Process Management Regulator Technologies, Inc., 2015.
Extended European Search Report issued in European Patent Application No. 19750559.7, dated Oct. 6, 2021.
"Type OS/80X, OS/84X and OS/88X Slam-Shut Controller," Emerson Process Management Regulator Technologies, Inc., 2015.
"TartariniTM" Type BM9 Slam Shut Valve, Emerson (2022). Retrieved from the Internet on Jul. 18, 2022: <https://www3.emersonprocess.com/Regulators/BM9_Product_Animation/BM9%20Product%20Animation.html?gl=1*1ht630j*_ga*NTE4Mzc4Mjc-yLjE1OTgyOTQ4ODI.*_ga_1MGRRDNV9H*MTY1N-DYzOTA1Mi4xMjUuMC4xNjU0NjM5MDUyLjA>.
Communication Pursuant to Article 94(3) EPC, issued in European Patent Application No. 19750559.7, dated Sep. 6, 2022.

* cited by examiner

ACTUATOR ASSEMBLY FOR A FLUID CONTROL DEVICE

TECHNICAL FIELD

The present disclosure relates to a fluid control device, and in particular, to an actuator assembly for a fluid control device.

BACKGROUND

A slam-shut valve is a type of valve that quickly actuates in the event of a detected process condition. Generally, a slam-shut valve is composed of a valve and a slam-shut trigger mechanism, which can drive a control element to quickly shut off the flow passage of the valve when the pressure at certain control points within the valve reaches a fixed set value. The slam-shut valve effectively shuts off the fluid to protect the downstream components in the system when the certain fixed set values are met. When the trip condition clears, it is necessary to manually open the valve to reset the system. However, the shut-off element is a component that is arranged inside the valve body, and therefore the shut-off element cannot typically be directly or easily opened.

SUMMARY

In accordance with a first exemplary aspect, a fluid control device may include a body having an inlet, an outlet, and a fluid flow path between the inlet and the outlet. The fluid control device may include a seat and a control element that is coupled to a stem. The control element and the stem may be movable along a first axis and may be biased toward a closed position in which the control element engages the seat. The fluid control device may include an actuator assembly. The actuator assembly may include a Scotch yoke mechanism, a trigger mechanism, and a shaft that is operatively coupled to the stem via the Scotch yoke mechanism such that rotation of the shaft in a first rotational direction causes movement of the stem and the control element along the first axis in a first translational direction. The trigger mechanism may be responsive to fluid pressure, and may prevent rotation of the shaft in a second rotational direction in a first mode of operation and may release the shaft to allow rotation of the shaft in the second rotational direction in a second mode of operation.

In accordance with a second exemplary aspect, a fluid control device may include a body having an inlet, an outlet, and a fluid flow path between the inlet and the outlet and a seat. A control element may be coupled to a stem. The control element and the stem may be movable along a longitudinal axis and may be biased toward a closed position in which the control element engages the seat. An actuator assembly may include a shaft that is operatively coupled to the stem. A rotational motion of the shaft in a first rotational direction may cause movement of the stem and the control element in a first translational direction. The fluid control device may include a seat and a valve assembly. The valve assembly may include a control element and a stem that may be coupled to the control element. The control element and the stem may be movable along a first axis and may be biased toward a closed position in which the control element engages the seat. An actuator assembly may include a first portion disposed inside of the valve body and a second portion disposed outside of the valve body. The first portion may include a first shaft that is operatively coupled to the valve assembly and to a second shaft of the second portion. A rotational motion of the first shaft in a first rotational direction may cause movement of the stem and the control element in a first translational direction.

In accordance with a third exemplary aspect, a fluid control device may include a valve body having an inlet, an outlet, and a fluid flow path between the inlet and the outlet. The fluid control device may include a seat, a valve assembly, and an actuator assembly. The valve assembly may include a control element and a stem that may be coupled to the control element. The control element and the stem may be movable along a first axis and may be biased toward a closed position in which the control element engages the seat. The actuator assembly may include a first portion disposed inside the valve body and a second portion that may be accessible outside the valve body. The first portion may include a first shaft that may be operatively coupled to the stem of the valve assembly and to a second shaft of the second portion. A rotational motion of the first shaft in a first rotational direction may cause movement of the stem and the control element in a first translational direction.

In further accordance with any one or more of the foregoing first, second, or third exemplary aspects, a fluid control device may further include any one or more of the following preferred forms.

In a preferred form, the actuator assembly may include a handle that is positioned outside of the body.

In a preferred form, the handle may be operatively coupled to the shaft and may be configured to facilitate rotation of the shaft in the first rotational direction to move the control element along the first axis in the first translational direction from the closed position to an open position in which the control element is spaced away from the seat.

In a preferred form, the first axis may be a longitudinal axis of the body.

In a preferred form, the longitudinal axis may extend between the inlet and the outlet of the body.

In a preferred form, the shaft may be operatively coupled to a first gear.

In a preferred form, the handle may be operatively coupleable, via a second shaft, to a second gear that is engaged with the first gear.

In a preferred form, the shaft may be operatively coupled to the stem via a Scotch yoke mechanism.

In a preferred form, a trigger mechanism may be responsive to fluid pressure.

In a preferred form, the trigger mechanism may prevent rotation of the shaft in a second rotational direction in a first mode of operation.

In a preferred form, the trigger mechanism may release the shaft to allow rotation of the shaft in the second rotational direction in a second mode of operation.

In a preferred form, the Scotch yoke mechanism may include a plate, a bolt, a bushing and a handle.

In a preferred form, the plate may be arranged on the valve stem, the bolt may be mounted on the handle, and the bushing may be movably arranged on the bolt.

In a preferred form, the bushing may connect to the side surface of the plate.

In a preferred form, the handle may be connected to the first transmission shaft.

In a preferred form, the plate and the valve stem may be linearly driven by the rotary motion of the handle.

In a preferred form, the plate may be integrally formed with the valve stem.

In a preferred form, the plate may be a separate part arranged at one end of the valve stem.

In a preferred form, the second gear may be coaxial with the first transmission shaft.

In a preferred form, the first transmission shaft may include a first transmission portion and a second transmission portion that are coaxially arranged.

In a preferred form, one end of the first transmission portion may be connected to the handle of the Scotch yoke mechanism, and the other end may be connected to the second transmission portion.

In a preferred form, one end of the second transmission portion may be connected to the first transmission portion, and the other end may be connected to the first gear of the transmission mechanism.

In a preferred form, the Scotch yoke mechanism may include a second transmission shaft.

In a preferred form, one end of the second transmission shaft may be connected to the first gear, and the other end may be connected to a handle of the fluid control device.

In a preferred form, the first gear may include a gear set, and the output radius of the gear set may be smaller than the radius of the second gear.

In a preferred form, the second gear may be smaller than the first gear.

Any one or more of these aspects may be considered separately and/or combined with each other in any functionally appropriate manner. In addition, any one or more of these aspects may further include and/or be implemented in any one or more of the optional exemplary arrangements and/or features described hereinafter. These and other aspects, arrangements, features, and/or technical effects will become apparent upon detailed inspection of the figures and the following description.

DETAILED DESCRIPTION

An actuator assembly 1 for an axial flow slam-shut valve is provided with a Scotch yoke mechanism 11 to change the direction of movement (or the mode of transmission) to a shut-off control element for the valve.

Figure 1:
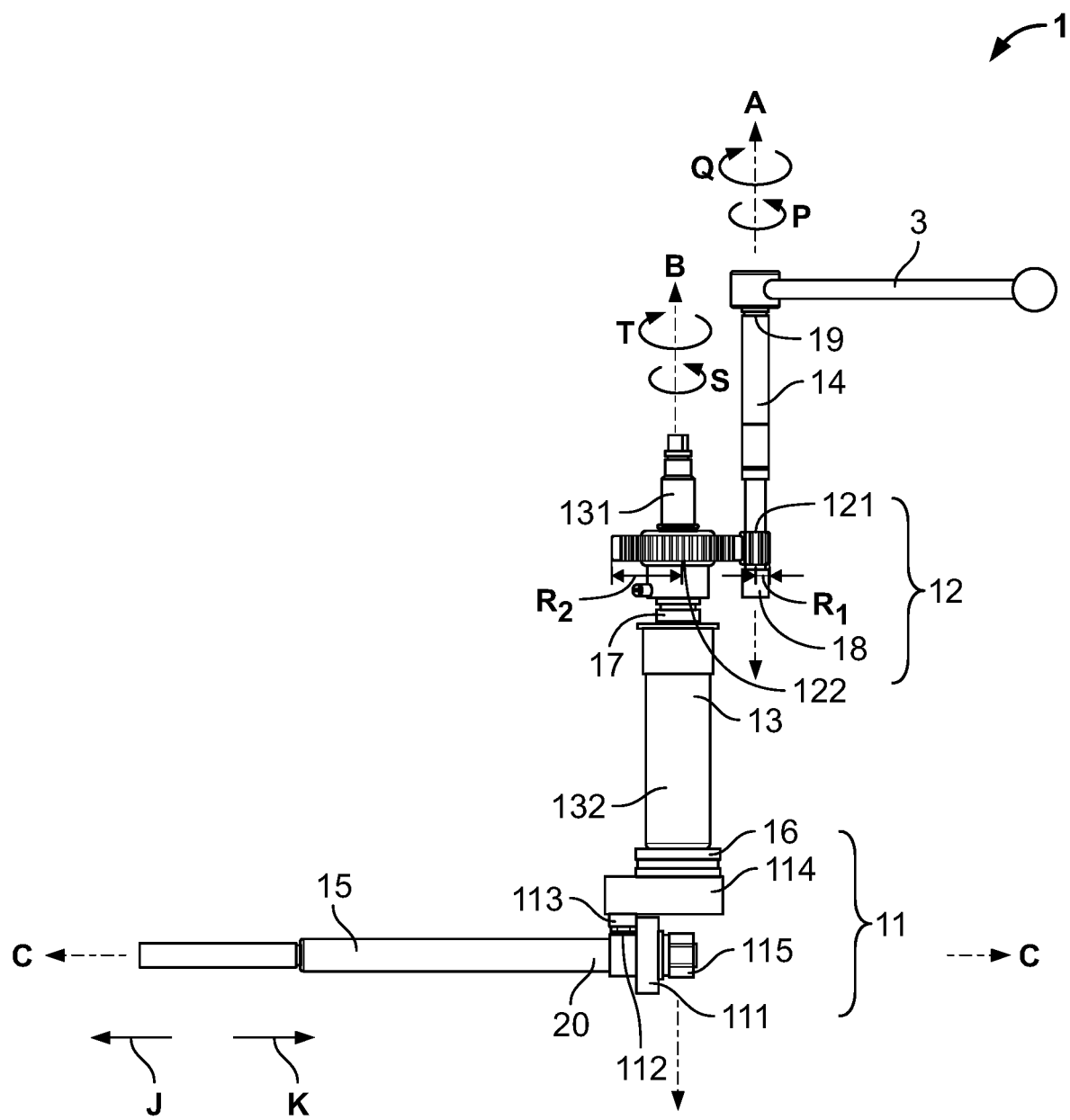
FIG. 1 is a side view of an actuator assembly having a first exemplary Scotch yoke mechanism for a fluid control device assembled in accordance with the teachings of the present disclosure and showing the Scotch yoke mechanism in a first position.
Figure 4:
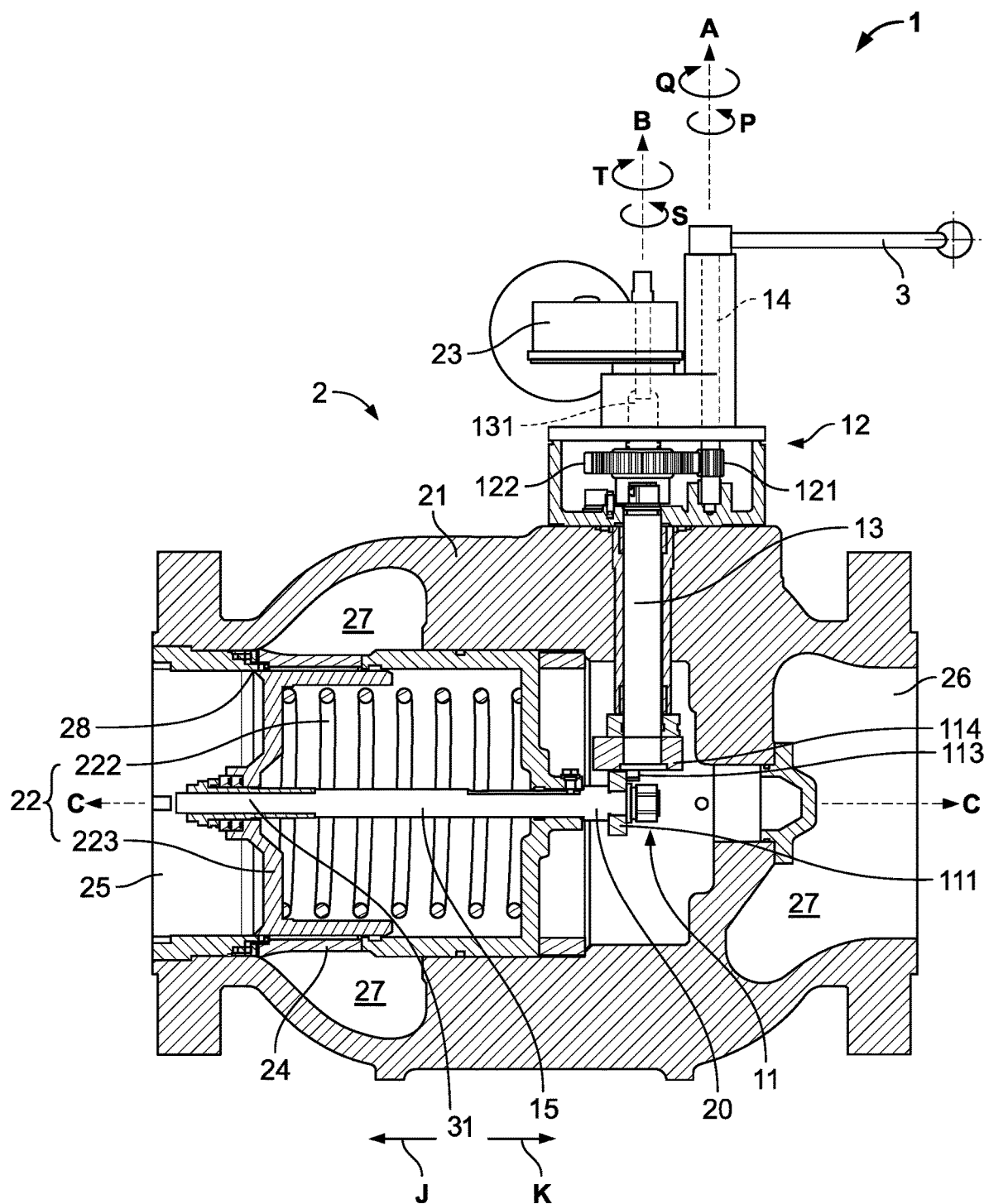
FIG. 4 is a cross-sectional side view of an axial flow slam-shut valve and Scotch yoke mechanism of FIG. 1 assembled in accordance with the teachings of the present disclosure and showing the axial flow slam-shut valve in a closed position and the Scotch yoke mechanism in the first position.
Figure 5:
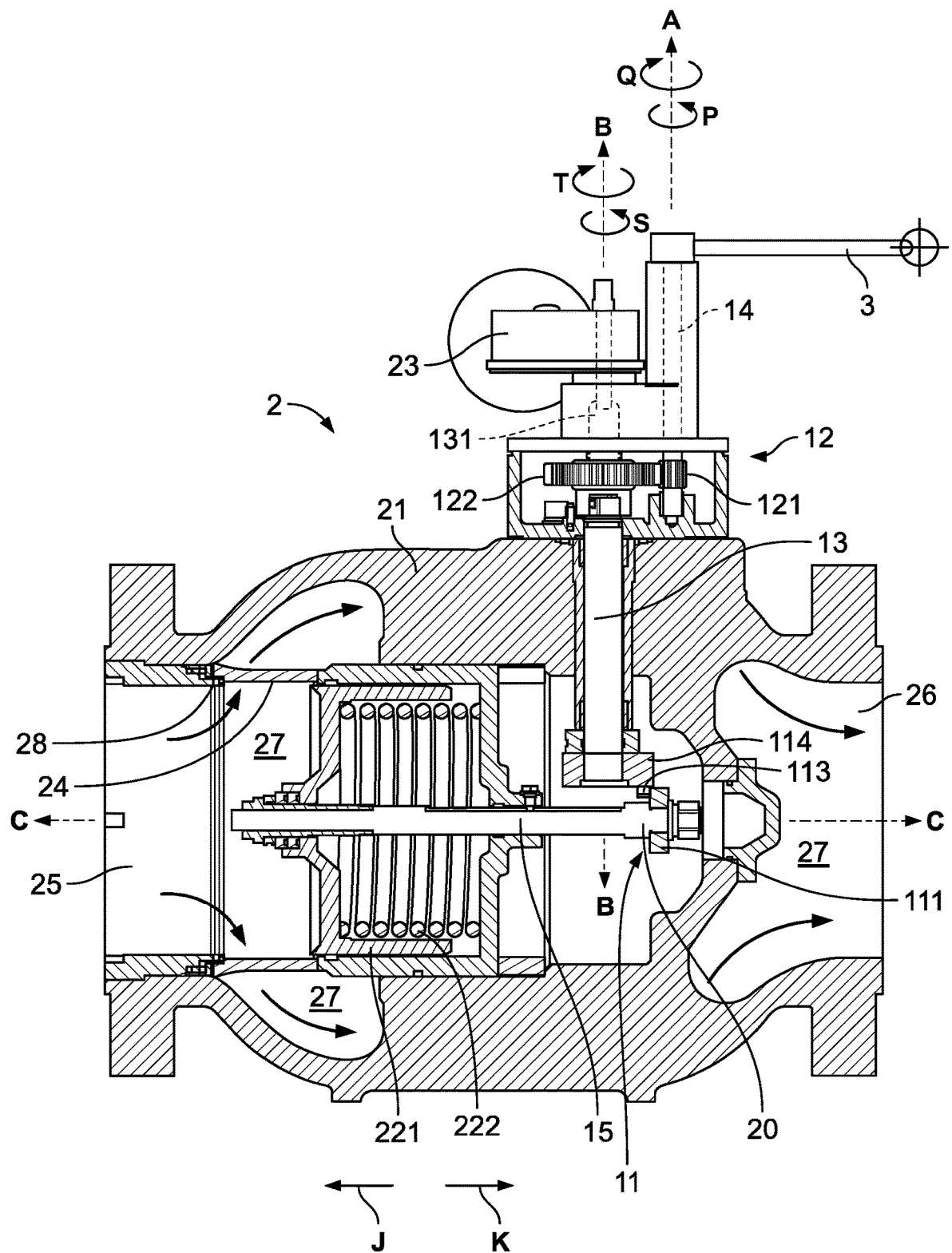
FIG. 5 is a cross-sectional side view of the axial flow slam-shut valve of FIG. 4 in an open position and the Scotch yoke mechanism in the second position.

FIG. 1 illustrates the actuator assembly 1 for a slam-shut valve and is constructed in accordance with the teachings of the present disclosure. The actuator assembly 1 includes a first exemplary Scotch yoke mechanism 11, a transmission mechanism 12, a first transmission shaft 13, and a second transmission shaft 14. The Scotch yoke mechanism 11 is connected to a valve stem 15 of an axial flow slam-shut valve (as shown in FIGS. 4 and 5) and transmits rotational motion of the actuator assembly 1 to linear motion of the valve stem 15 to open and close the valve. The Scotch yoke mechanism 11 of FIG. 1 includes a plate 111, a bolt 112, a bushing 113, and a handle 114, and will be described in more detail below. As used herein, a Scotch yoke mechanism is a mechanism that includes a pin that couples a sliding component to a rotating component.

The transmission mechanism 12 includes a first gear 121 and a second gear 122 engaged with the first gear 121. A radius R1 of the first gear 121 is smaller than a radius R2 of the second gear 122. A first end 16 of the first transmission shaft 13 is operatively coupled to the Scotch yoke mechanism 11, and an opposite second end 17 of the first transmission shaft 13 is operatively coupled to the second gear 122 of the transmission mechanism 12. A first end 18 of the second transmission shaft 14 is operatively coupled to the first gear 121, and an opposite second end 19 of the second transmission shaft 14 is operatively coupled to a handle 3 of the actuator assembly 1.

In the illustrated example, the radius R1 of the first gear 121 is smaller than the radius R2 of the second gear 122 to achieve a certain movement of the valve stem 15 when a particular torque is applied to the handle 3 of the actuator assembly 1. However, the torque required to move the valve stem 15 can be changed by altering the ratio of the radius R1 of the first gear 121 to the radius R2 of the second gear 122. As such, the torque to operate the actuator assembly 1 can be increased by changing the gear radius ratio of the transmission mechanism 12 to a torque required for opening the actuator assembly 1 (i.e., moving the valve stem 15). In another example, the radius R1 of the first gear 121 is larger than the radius R2 of the second gear 122.

In applications where a large torque is required to move the valve stem 15 along a C axis, the Scotch yoke mechanism 11 and the transmission mechanism 12 cooperate with each other to increase the torque achieved by rotating the handle 3, accordingly. In one example, the first gear 121 comprises a gear set (e.g., two or more planetary gears), and the output radius of the gear set 121 is less than the radius R2 of the second gear 122. A suitable number of gears for the gear set 121 and a suitable size of the gear set may be selected by a skilled person in the art according to a specific application environment and to achieve the purpose of amplifying the torque by changing a radius ratio R1:R2 of the gears 121, 122.

In the illustrated example, the first transmission shaft 13 and a second transmission shaft 14 are arranged so that the axis of the second gear 122 is aligned with the axis of the first transmission shaft 13.

When the transmission mechanism 12 is activated, the first gear 121 is rotatably driven by an external force (i.e., the handle 3 rotates to move the second transmission shaft 14), the second gear 122 is rotated to rotate the first transmission shaft 13, and the Scotch yoke mechanism 11, which is operatively coupled to the first transmission shaft 13, converts the rotary motion provided by the second gear 122 to a linear motion to move the valve stem 15, as will be described further below. Specifically, the handle 3 is rotated about a longitudinal axis A of the second transmission shaft 14 to rotate the first gear 121 about the longitudinal axis A. The rotational motion of the first gear 121 drives the second gear 122 and the first transmission shaft 13 to rotate about a longitudinal axis B of the first transmission shaft 13 in a direction opposite that of the first gear 121. The rotational motion of the second gear 122 and the first transmission shaft 13 is transmitted to the Scotch yoke mechanism 11.

The first transmission shaft 13 includes a first transmission portion 131 and a second transmission portion 132 that are axially aligned about the B axis. The second transmission portion 132 is operatively coupled to the handle 114 of the Scotch yoke mechanism 11, and the first transmission portion 131 is connected to the second gear 122 of the transmission mechanism 12. As will be described further below, the first transmission portion 131 may be operatively coupled to a trigger mechanism for a slam-shut functionality. The first transmission portion 131 may be integrally formed with the second transmission portion 132. However, in another example, the first transmission portion 131 and the second transmission portion 132 are two separate components connected to each other by a suitable fastening means such that the first transmission portion 131 and the second transmission portion 132 move together as a unitary component. The structure of the transmission shaft 13 may be determined according to specific application requirements.

To operate the actuator assembly 1, the handle 3 is rotated in a Q direction about the longitudinal axis A of the second transmission shaft 14 to rotate the second transmission shaft 14 and the first gear 121 in the Q direction about the longitudinal axis A. The rotational motion of the first gear 121 is transmitted to the second gear 122, causing the second gear 122 to rotate in an S direction, opposite the Q direction, about the longitudinal axis B of the first transmission shaft 13. The second gear 122 rotates the first transmission shaft 13 in the S direction, which in turn transmits the rotational motion about the longitudinal axis B to the Scotch yoke mechanism 11. The Scotch yoke mechanism 11 converts rotational motion transmitted from the first transmission shaft 13 to linear motion along the longitudinal axis C of the valve stem 15. In this example, a rotational motion S of the first shaft 13 causes the valve stem 15 to move linearly in the direction K, and a rotational motion T of the first shaft 13 causes the valve stem 15 to move linearly in the direction J. As shown in FIG. 1, the valve stem 15 is in a first position.

Figure 3:
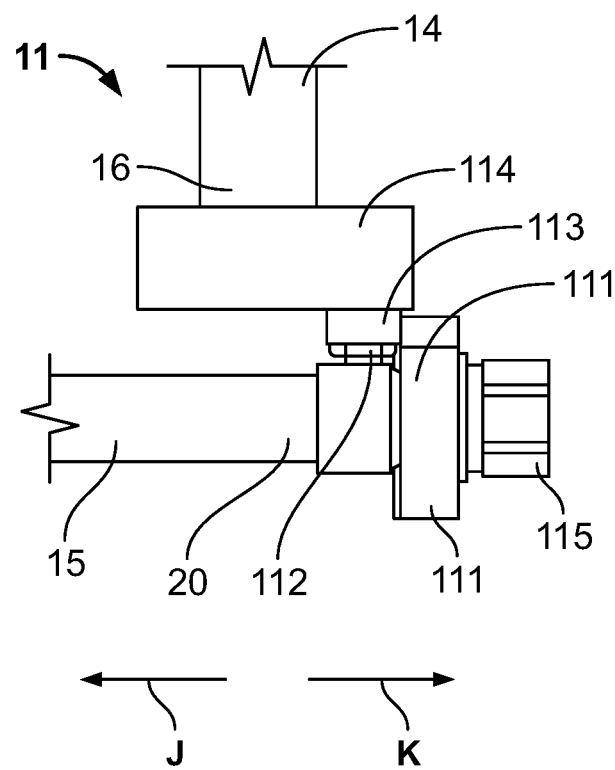
FIG. 3 is a partial side view of the first exemplary Scotch yoke mechanism of FIG. 1 and showing the Scotch yoke mechanism in a second position.

In the first exemplary Scotch yoke mechanism 11 of FIGS. 1 and 3, the plate 111 is arranged on a first end 20 of the valve stem 15, the bolt 112 is mounted to the handle 114, and the handle 114 is connected to the first end 16 of the first transmission shaft 13. The bushing 113 is movably arranged on the bolt 112, and the bushing 113 is operatively coupled the side surface of the plate 111. In the first exemplary Scotch yoke mechanism 11, the plate 111 is a separate part arranged at the first end 20 of the valve stem 15 and is secured to the plate 111 via the bushing 113. In some cases, the plate 111 is additionally secured to the valve stem 15 via a fastening member 115 As shown in FIG. 3, the valve stem 15 is in a second position.

When the first transmission shaft 13 drives the handle 114 to rotate, the bushing 113 (arranged on the bolt 112) will drive the plate 111 linearly, thereby causing the plate 111 to move the valve stem 15 in the J or K directions.

Figure 2:
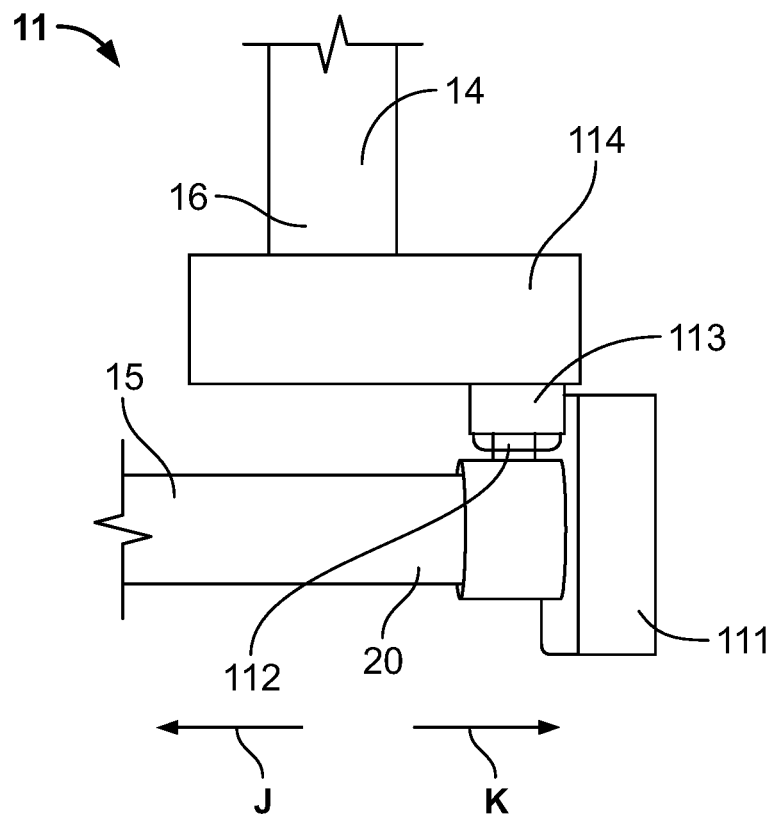
FIG. 2 is partial side view of a second exemplary Scotch yoke mechanism assembled in accordance with the teachings of the present disclosure and showing the Scotch yoke mechanism in a second position.

In FIG. 2, a second exemplary Scotch yoke mechanism 11 is constructed according to the teachings of the present disclosure. In this example, the plate 111 is integrally formed with the valve stem 15 to facilitate installation and to reduce costs associated with assembly and manufacturing.

Turning to FIGS. 4 and 5, an exemplary fluid control device 2 is constructed according to the teachings of the present disclosure. The fluid control device 2 is an axial flow slam-shut valve 2 and is operatively coupled to an actuator assembly 1, such as the actuator assembly 1 of FIGS. 1 and 3. The axial flow slam-shut valve 2 includes a valve body 21 and a valve assembly 22 arranged in the valve body 21. The valve body 21 includes an inlet 25, an outlet 26, and a fluid flow path 27 between the inlet 25 and the outlet 26. The valve body 21 includes a longitudinal axis that is coaxially aligned with the longitudinal axis C of the valve stem 15. The flow path 27 is arranged outside the valve assembly 22 so that the flow path 27 is no longer limited by the size of the valve assembly 22 and can provide greater flow.

The valve assembly 22 includes the valve stem 15, a control element 223 coupled to a second end 31 of the stem 15, a spring 222, and a trigger mechanism 23. The valve stem 15 and control element 223 of the valve assembly 22 are movable along the longitudinal axis C. The control element 223 is biased by the spring 222 toward a closed position in which the control element 223 engages a seat 28 to prevent fluid flow between the inlet 25 and the outlet 26. In the illustrated example, the valve assembly 22 is arranged inside a valve cage 24 and the flow path 27 is primarily disposed outside the valve assembly 22. The first end 20 of the valve stem 15, opposite the second end 31, is connected to the plate 111 of the actuator assembly 1. The control element 223 moves linearly with the valve stem 15 in the K direction to open the valve 2 or in the J direction to engage the valve seat 28 to close the valve 2.

The trigger mechanism 23 is responsive to fluid pressure and is arranged on the outside of the valve body 21. The trigger mechanism 23 is operatively coupled to the first transmission portion 131 of the first transmission shaft 13 of the actuator assembly 1. The second transmission portion 132 of the first transmission shaft 13 is operatively coupled to the valve stem 15 via the Scotch yoke mechanism 11. The trigger mechanism 23 is configured to prevent rotation, against the biasing force applied by the spring 222 through the Scotch yoke mechanism 11, of the first transmission shaft 13 in the rotational direction T in a first mode of operation, and releases the first transmission shaft 13 to allow rotation of the first transmission shaft 13, under the biasing force applied by the spring 222 through the Scotch yoke mechanism 11, in the rotational direction T in a second mode of operation.

Figure 6:
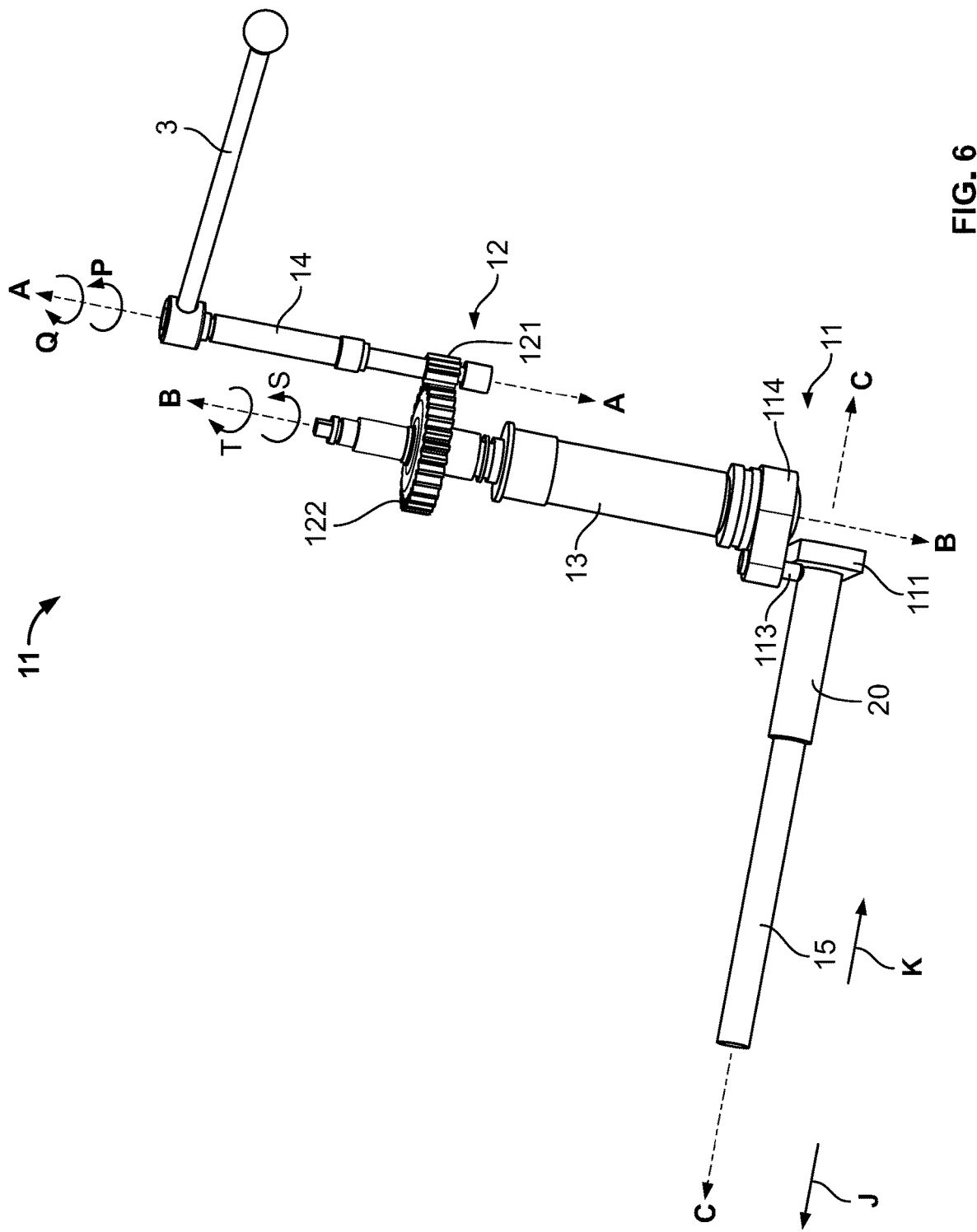
FIG. 6 is side view of a second exemplary actuator assembly for a control valve and including the second exemplary Scotch yoke mechanism of FIG. 2 assembled in accordance with the teachings of the present disclosure and showing the Scotch yoke mechanism in the first position.

As shown in FIGS. 4 and 6, the slam-shut valve 2 is in a closed position such that the control element 223 engages the seat 28 to close the valve 2. To open the valve 2 from this closed position, the handle 3, which is removable from the second transmission shaft 14 and is so removed during normal operation of the valve 2, may be connected to the second transmission shaft 14 and rotated in a first direction Q about the longitudinal axis A of the second transmission shaft 14. The second transmission shaft 14 of the transmission mechanism 12 causes the first transmission shaft 13 to rotate in a rotational direction S (via first and second gears 121, 122). Rotational motion of the first transmission shaft 13 in the rotational direction S is converted to linear motion by the Scotch yoke mechanism 11, thereby moving the valve stem 15 and the control element 223 in a translational direction K along the longitudinal axis C. As such, the control element 223 moves away from the valve seat 28, opening the valve 2, as shown in FIG. 5. The valve 2 is maintained in this open position by the trigger mechanism 23, which prevents rotation of the first transmission shaft 13 when no over-pressure or under-pressure condition for which the trigger mechanism 23 has been configured is present (i.e., in a first, normal mode of operation). A relatively small torque applied via the handle 3 is multiplied via the gear ratio between the first and second gears 121 and 122 into a significantly larger torque, thus making the resetting operation to open the valve 2 much less cumbersome than in known slam-shut valves.

In FIG. 5, the axial flow slam-shut valve 2 is in an open position. When the valve 2 is open, fluid can flow through the openings in the cage 24 and into the flow pathway 27, and the valve 2 will be maintained in this open position absent any over-pressure or under-pressure condition for which the trigger mechanism 23 has been configured. When an over-pressure or under-pressure condition is detected by the trigger mechanism 23, the trigger mechanism 23 facilitates the shaft 13 to rotate in the rotational direction T. By facilitating the shaft 13 to rotate, the trigger mechanism 23 thus enables the shaft 15 and the control element 221 to move in the direction J under the biasing force provided by the spring 222 until the control element 221 engages the seat 28. In this closed position, fluid is prevented from flowing between the inlet 25 and the outlet 26. When the over-pressure or under-pressure condition that is cleared, the valve 2 can be reset (i.e., opened) via the handle 3 as described above.

The actuator assembly 1 is advantageously disposed outside of the valve body 21 of the axial valve 2. As such, the range of the shut-off point of the axial flow slam-shut valve 2 is not limited by the range of the Scotch yoke mechanism 11. When the torque requirement for actuating the valve assembly 22 is greater, the size of the Scotch yoke mechanism 11 may remain the same, and the transmission mechanism 12 may be modified to satisfy the torque requirement (e.g., the gear ratio between gears 121 and 122 may be adjusted). Further, the transmission mechanism 12 may be easily modified without replacing the handle 3 with a longer handle or requiring an increase in the manual force applied to the handle 3. As such, all modifications may take place outside of the valve body 21, and do not require disassembling the axial flow valve 2.

In the present disclosure, the actuator assembly 1, the transmission mechanism 12, and Scotch yoke mechanism 11 adopt a modular design, which is easy to install and maintain. Standardized, generalized or serialized components can be used in the transmission mechanism 12 and Scotch yoke mechanism 11, which are easy to produce with a lower cost.

The figures and description provided herein depict and describe preferred embodiments of an axial regulator for purposes of illustration only. One skilled in the art will readily recognize from the foregoing discussion that alternative embodiments of the components illustrated herein may be employed without departing from the principles described herein. Thus, upon reading this disclosure, those of skill in the art will appreciate still additional alternative structural and functional designs for the axial regulator. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the methods and components disclosed herein without departing from the spirit and scope defined in the appended claims.

What is claimed:

1. A fluid control device comprising:
a valve body having an inlet, an outlet, and a fluid flow path between the inlet and the outlet;
a seat;
a valve assembly including a stem and a control element that is coupled to the stem, wherein the control element and the stem are movable along a first axis and biased toward a closed position, in which the control element engages the seat;
an actuator assembly comprising:
a Scotch yoke mechanism;
a shaft that is operatively coupled to the stem via the Scotch yoke mechanism such that rotation of the shaft in a first rotational direction causes movement of the stem and the control element along the first axis in a first translational direction; and
a slam-shut trigger that is configured to control rotation of the shaft in a second rotational direction responsive to fluid pressure; and
a cage having circumferential openings and partially surrounding the valve assembly such that the fluid flow path extends around the valve assembly.

2. The fluid control device of claim 1, wherein the actuator assembly further comprises a handle that is positioned outside of the valve body, and wherein the handle is operatively coupleable to the shaft and is configured to facilitate rotation of the shaft in the first rotational direction to move the control element along the first axis in the first translational direction from the closed position to an open position, in which the control element is separated from the seat.

3. The fluid control device of claim 1, wherein the first axis is a longitudinal axis of the valve body.

4. The fluid control device of claim 3, wherein the longitudinal axis of the valve body extends between the inlet and the outlet of the valve body.

5. The fluid control device of claim 1, wherein the shaft is operatively coupled to a first gear.

6. The fluid control device of claim 5, wherein a handle is operatively coupleable, via a second shaft, to a second gear that is engaged with the first gear.

7. The fluid control device of claim 6, wherein the second gear is smaller than the first gear.

8. The fluid control device of claim 1, wherein a portion of the fluid flow path extends radially around the valve assembly such that the stem is fluidly isolated.

9. A fluid control device comprising:
a valve body having an inlet, an outlet, and a fluid flow path between the inlet and the outlet;
a seat;
a valve assembly having a stem and a control element that is coupled to the stem, wherein the control element and the stem are movable along a longitudinal axis and biased toward a closed position, in which the control element engages the seat;
an actuator assembly including a shaft that is operatively coupled to the stem;
a cage having circumferential openings and partially surrounding the valve assembly such that the fluid flow path extends around the valve assembly;
wherein rotational motion of the shaft in a first rotational direction causes movement of the stem and the control element in a first translational direction to separate the control element from the seat; and
a slam-shut trigger that is configured to control rotation of the shaft in a second rotational direction responsive to fluid pressure.

10. The fluid control device of claim 9, wherein the shaft is operatively coupled to the stem via a Scotch yoke mechanism.

11. The fluid control device of claim 9, wherein the actuator assembly further comprises a handle that is positioned outside of the valve body, and wherein the handle is operatively coupleable to the shaft and is configured to facilitate rotation of the shaft in the first rotational direction to move the control element in the first translational direction from the closed position to an open position in which the control element is separated from the seat.

12. The fluid control device of claim 11, wherein the shaft is operatively coupled to a first gear.

13. The fluid control device of claim 12, wherein the handle is operatively coupleable to a second gear that is engaged with the first gear.

14. The fluid control device of claim 13, wherein the second gear is smaller than the first gear.

15. A fluid control device comprising:
a valve body having an inlet, an outlet, and a fluid flow path between the inlet and the outlet;
a seat;
a valve assembly including a control element and a stem that is coupled to the control element, the control element and the stem being movable along a first axis and biased toward a closed position in which the control element engages the seat; and
an actuator assembly including a first portion disposed inside the valve body and a second portion that is accessible outside the valve body, the first portion including a first shaft that is operatively coupled to the stem of the valve assembly, the second portion including a second shaft operatively coupled to the first shaft;
a Scotch yoke mechanism operatively coupling the first shaft to the stem; and
a cage having circumferential openings and partially surrounding the valve assembly such that the fluid flow path extends around the valve assembly;
wherein rotational motion of the first shaft in a first rotational direction causes movement of the stem and the control element in a first translational direction.

16. The fluid control device of claim 15, further comprising a slam-shut trigger that is configured to control rotation of the shaft in a second rotational direction responsive to fluid pressure.

17. The fluid control device of claim 15, wherein the second portion of the actuator assembly further comprises a handle that is operatively coupled to the first shaft and is configured to facilitate rotation of the first shaft in the first rotational direction to move the control element along the first axis in the first translational direction from the closed position to an open position in which the control element is separated from the seat.

18. The fluid control device of claim 17, wherein the handle is operatively coupled to the first shaft via a transmission mechanism, the transmission mechanism comprising a first gear and a second gear.

19. The fluid control device of claim 18, wherein the first shaft is operatively coupled to the first gear and the handle is operatively coupled to the second gear that is engaged with the first gear.

* * * * *

UNITED STATES PATENT AND TRADEMARK OFFICE
CERTIFICATE OF CORRECTION

PATENT NO. : 11,692,640 B2
APPLICATION NO. : 16/968864
DATED : July 4, 2023
INVENTOR(S) : Jie Yuan et al.

It is certified that error appears in the above-identified patent and that said Letters Patent is hereby corrected as shown below:

In the Specification

At Column 5, Line 53, "coupled" should be -- coupled to --.

In the Claims

At Column 9, Line 27, "seat; and" should be -- seat; --.

Signed and Sealed this
Second Day of July, 2024

Katherine Kelly Vidal
*Director of the United States Patent and Trademark Office*